United States Patent
Shen et al.

(10) Patent No.: US 10,308,188 B2
(45) Date of Patent: Jun. 4, 2019

(54) STORAGE ASSEMBLY AND A CENTER CONSOLE IN A VEHICLE

(71) Applicant: Ford Global Technologies LLC, Dearborn, MI (US)

(72) Inventors: Kevin Shen, Nanjing (CN); Xuezhi Jin, Nanjing (CN); Tony Hu, Nanjing (CN); Fernando Zhao, Nanjing (CN); Wei Xu, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/910,819

(22) Filed: Mar. 2, 2018

(65) Prior Publication Data
US 2018/0265009 A1   Sep. 20, 2018

(30) Foreign Application Priority Data
Mar. 17, 2017   (CN) ........................ 2017 1 0161612

(51) Int. Cl.
| B60N 3/10 | (2006.01) |
| B60R 7/04 | (2006.01) |
| B60R 11/02 | (2006.01) |
| B60R 11/00 | (2006.01) |

(52) U.S. Cl.
CPC ............... B60R 7/04 (2013.01); B60N 3/102 (2013.01); B60R 11/0241 (2013.01); *B60R 2011/0007* (2013.01)

(58) Field of Classification Search
CPC .............. B60R 7/04; B60R 11/0241; B60R 2011/0007; B60N 3/102; B60N 3/10
USPC .................................................... 296/24.34
See application file for complete search history.

(56) References Cited

U.S. PATENT DOCUMENTS

| 2,778,702 | A | * | 1/1957 | Franks ................. | B60N 3/102 312/242 |
| 4,927,200 | A | * | 5/1990 | Wilkins ................. | B60R 7/043 224/271 |
| 5,024,411 | A | * | 6/1991 | Elwell ................... | B60N 3/102 224/281 |
| 5,085,481 | A | | 2/1992 | Fluharty et al. | |
| 5,527,008 | A | * | 6/1996 | Schutter ............... | B60N 3/102 224/926 |

(Continued)

FOREIGN PATENT DOCUMENTS

KR   19970038573 A1   7/1997

*Primary Examiner* — Pinel E Romain
(74) *Attorney, Agent, or Firm* — Vichit Chea; Kolitch Romano LLP

(57) ABSTRACT

A storage assembly comprises a first cover having a first foot portion, a second cover having a second cover and a housing. The housing includes a first rail extending at a height direction and having a first end, a second rail extending at the height direction and having a second end, and a cavity forming a storage space. The first cover is moveable between a first stowed position and a first middle position when the first foot portion moves in the first rail, and pivotable via the first end from the first middle position to a first use position to cover the cavity, and the second cover is moveable between a second stowed position and a second middle position when the second foot portion moves in the second rail, and pivotable via the second end from the second middle position to a second use position to cover the cavity.

19 Claims, 9 Drawing Sheets

(56) References Cited

U.S. PATENT DOCUMENTS

| | | | | |
|---|---|---|---|---|
| 5,845,888 A * | 12/1998 | Anderson | ............... | B60N 3/102 |
| | | | | 248/311.2 |
| 6,234,439 B1 * | 5/2001 | Townsend | ............... | B60N 3/102 |
| | | | | 248/309.1 |
| 6,830,277 B2 * | 12/2004 | Zierle | .................... | B60N 3/102 |
| | | | | 296/37.12 |
| 8,276,964 B2 | 10/2012 | Werner et al. | | |
| 8,827,108 B2 * | 9/2014 | Tsunoda | ................. | B60N 3/106 |
| | | | | 220/529 |
| 8,939,491 B2 | 1/2015 | Gillis et al. | | |
| 9,440,573 B1 * | 9/2016 | Dunham | ................. | B60N 3/107 |
| 9,573,529 B2 * | 2/2017 | Hipshier | .................. | B60N 2/90 |
| 9,597,991 B2 * | 3/2017 | Amick | ................... | B65D 43/16 |
| 9,796,314 B2 * | 10/2017 | Neumann | ............. | B60N 3/102 |
| 9,796,315 B1 * | 10/2017 | Oros | ...................... | B60N 3/106 |
| 9,796,316 B1 * | 10/2017 | Siqueira | ................ | B60N 3/106 |
| 9,969,312 B2 * | 5/2018 | Stiver | .................... | B60N 3/102 |
| 9,981,589 B2 * | 5/2018 | Senda | .................... | B60N 3/107 |
| 10,029,619 B2 * | 7/2018 | Sahs | ........................ | B60R 7/04 |
| 10,077,592 B1 * | 9/2018 | Thorsell | ................ | E05F 17/004 |
| 2014/0300125 A1 | 10/2014 | Brinas | | |
| 2015/0197201 A1 * | 7/2015 | Greiner | .................... | B60R 7/04 |
| | | | | 296/24.34 |
| 2015/0375685 A1 | 12/2015 | Krishnan et al. | | |
| 2018/0105088 A1 * | 4/2018 | Yokoyama | ............. | B60N 2/793 |

* cited by examiner

STORAGE ASSEMBLY AND A CENTER CONSOLE IN A VEHICLE

RELATED APPLICATION

This application claims the benefit of Chinese Patent Application No.: CN 201710161612.2 filed on Mar. 17, 2017, the entire contents thereof being incorporated herein by reference.

FIELD

The present application relates a storage assembly and a center console in a vehicle, in particular, a storage assembly and a center console to hold different sizes of items.

BACKGROUND

There are usually many storages to hold items in a vehicle, such as a cup holder at a center armrest between rear seats or a cup holder at a center console. Because of the package requirement in the vehicle, it is desirable to have a storage assembly to utilize the space efficiently to hold various items such as a cup and a cell phone.

US patent US 2015/0375685 A1 discloses a customized console system in a vehicle that includes two or more console organizers of substantially any desired configuration, a base unit having a receiver for alternately holding one of the organizers and a storage receiver for receiving and holding any of the organizer not in use. While not in use, the console organizers are held in the storage receiver positioned under a passenger seat or in a trunk of the vehicle. However, it is not convenient to have a separate storage receiver positioned at a place different from the center consol.

SUMMARY

According to one aspect, a storage assembly in a vehicle is provided. The storage assembly comprises a first cover having a first foot portion and a second cover having a second foot portion; and a housing. The housing includes a first rail extending at a height direction and a second rail extending at the height direction, and a cavity forming a storage space. The first rail has a first end and the second rail has a second end, and the first end and the second end are adjacent to a top of the housing. The first cover is moveable between a first stowed position and a first middle position when the first foot portion moves in the first rail, and pivotable from the first middle position to a first use position via the first end to cover the cavity, and wherein the second cover is moveable between a second stowed position and a second middle when the second foot portion moves in the second rail, and pivotable from the second middle position to a second use position via the second end to cover the cavity.

In one embodiment, the housing may include a first groove to receive the first cover at the first stowed position and a second groove to receive the second cover at the second stowed position. The first rail may be communicated with the first groove and the second rail may be communicated with the second groove.

In another embodiment, the housing may include a first outer wall, a second outer wall, a first sidewall and a second sidewall. The first sidewall and the second sidewall define the cavity. The first groove is defined by the first outer wall and the first sidewall and is positioned on one side of the housing. The second groove is defined by the second outer wall and the second sidewall and is positioned on another side of the housing.

In another embodiment, the first sidewall may include a first top to support the second cover when the second cover is at the second use position, and the second sidewall may include a second top to support the first cover when the first cover is at the first use position. A height of the first top of the first sidewall and a height of the second top of the second sidewall are substantially the same.

In another embodiment, the housing may include a first outer wall, a second sidewall adjacent to the first outer wall, a first sidewall adjacent to the second sidewall and a second outer wall. The first sidewall and the second outer wall define the cavity. The first groove is defined by a first sidewall and the second sidewall, and the second groove is defined by the second sidewall and the first outer wall.

In another embodiment, the second outer wall may have a second top to support the first cover when the first cover is at the first use position, and a third top to support the second cover when the second cover is at the second use position. The second top and the third top have different heights.

In another embodiment, the first cover may include a first group through holes and the second cover may include a second group through holes different from the first group through holes. The first group through holes and the second group through holes are configured to hold items.

In another embodiment, the storage assembly is disposed in a center console of a vehicle.

According to another aspect, a center console of a vehicle is provided. The center console comprising a storage assembly. The storage assembly includes a first groove extending at a height direction; a first rail communicating with the first groove and having a first end at a top of the first rail; a second groove extending at the height direction; a second rail communicating with the second groove and having a second end at a top of the second rail; a cavity to form a storage space; a first cover having a first foot portion; and a second cover having a second foot portion. At a first stowed position, the first cover is positioned in the first groove, the first foot portion is positioned at a bottom of the first rail. The first cover is moveable from a first stowed position to a middle position in the first rail such that the first foot portion is adjacent to the first end and pivotable via the first end from the first middle position to a first use position to cover the cavity. At a second stowed position, the second cover is positioned in the second groove, the second foot portion is positioned at a bottom of the second rail. The second cover is moveable from the second stowed position to a second middle position such that the second foot portion is adjacent to the second end and pivotable via the second end from the second middle position to a second use position.

In one embodiment, the first foot portion may include two protrusions extending from two opposite sides of the first cover, and the second foot portion may include two protrusions extending from two opposite sides of the second cover.

According to another aspect, a storage assembly in a vehicle is provided. The storage assembly comprises a first cover; a second cover; and a housing. The housing includes a first groove extending at a height direction, a second groove extending at the height direction and a cavity to form a storage space. The first cover is moveable in the first groove and pivotable to a first use position to cover the cavity, and the second cover is moveable at the second groove and pivotable to a second use position to cover the cavity.

In one embodiment, the first cover may include a first group through holes, and the second cover may include a second group through holes different from the first group through holes.

In another embodiment, the first group through holes may include an annular-shaped hole to hold a cup or a drink container and a rectangular-shaped hole to hold a cellular phone, and the second group through holes may include annular-shaped holes to hold a cup or a drink container.

In another embodiment, the first groove and the second groove may be positioned at an opposite side of the cavity, respectively. The housing may further include a first rail communicating with the first groove and having a first end, and a second rail communicating with the second groove and having a second end.

In another embodiment, the first cover may include a first foot portion receivable in the first rail and the first foot portion is pivotally connected to the first end of the first rail to enable the first cover to be pivoted to the first use position when the first foot portion moves to the first end of the first rail with the first cover. The second cover may include a second foot portion receivable in the second rail, and the second foot portion is pivotally connected to the second end of the second rail to enable the second cover to be pivoted to the second use position when the second foot portion moves to the second end of the second rail with the second cover.

In another embodiment, the housing may include a first sidewall adjacent to the first groove, a first outer wall opposing the first sidewall, a second sidewall adjacent to the second groove, and a second outer wall opposing the second sidewall. The first groove is defined by the first outer wall and the first sidewall, and the second groove is defined by the second outer wall and the second sidewall. A height of the first sidewall and a height of the second sidewall are substantially the same. A height of the first outer wall and a height of the second outer wall are substantially the same. The height of the first sidewall is less than the height of the first outer wall.

In another embodiment, at the first use position or the second use position, an outer surface of the first cover and an outer surface of the second cover may be substantially aligned with top surfaces of the first outer wall and a top of the second outer wall.

In another embodiment, at the first use position or the second use position, an outer surface of the first cover and an outer surface of the second cover may be lower than a top surface of the first outer wall and a top surface of the second outer wall.

In another embodiment, one side of the first cover and one side of the second cover may include a first handle and a second handle, respectively, to facilitate movements of the first cover and the second cover.

The storage assembly of the present assembly includes different covers to hold items with different size and configurations. The storage assembly has a simple structure and it is easy for a user to use and store the covers.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

One or more advantageous features as described herein will be readily apparent from the following detailed description of one or more embodiments when taken in connection with the accompanying drawings.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed storage assemblies and center consoles will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various storage assemblies and center consoles are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figures 2A, 2B:
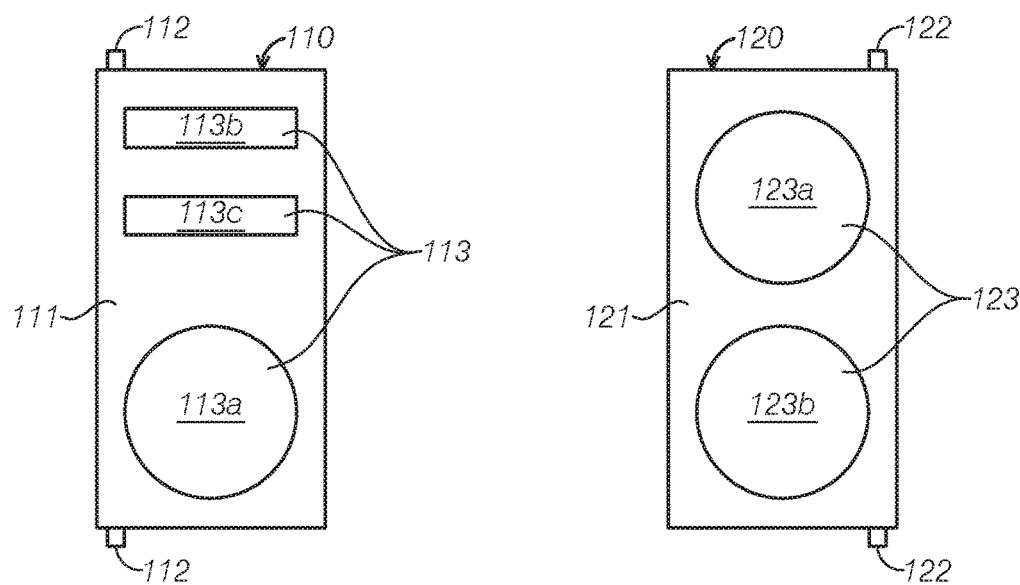
FIG. 2A shows a top view of a first cover of the storage assembly in FIG. 1.
FIG. 2B shows a top view of a second cover of the storage assembly in FIG. 1.
Figure 3:
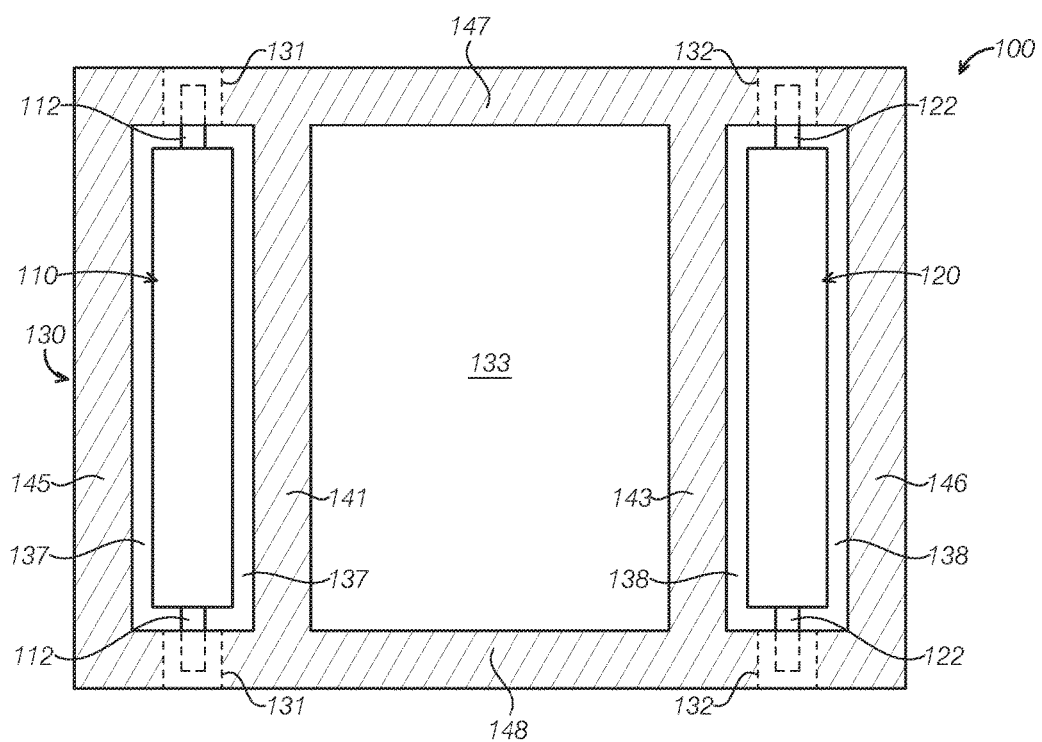
FIG. 3 shows a top view of the storage assembly in FIG. 1, illustrating the first cover and the second cover at a stowed position.

FIGS. 1 to 4 schematically illustrate an example storage assembly 100 in a vehicle according to one embodiment of the present disclosure. The storage assembly 100 comprises a first cover 110 having a first foot portion 112, a second cover 120 having a second foot portion 122, and a housing 130. The housing 130 may include a first outer wall 145, a second outer wall 146, a third outer wall 147 and a fourth outer wall 148. In one embodiment, the housing 130 may further include a first sidewall 141 adjacent to the first outer wall 145 and a second sidewall 143 adjacent to the second outer wall 146. Referring to FIGS. 3-4E, the housing 130 includes a first rail 131 extending at a height direction H and a second rail 132 extending at the height direction H, and a cavity 133 to form a storage space S. The first rail 131 is formed in the third outer wall 147 and the second rail 132 is formed in the fourth outer wall 148. The first rail 131 has a first end 135 and the second rail 132 has a second end 136. The first end 135 and the second end 136 are adjacent to a top 154 of the housing 130. The housing 130 may further include a first groove 137 defined by the first outer wall 145, the first sidewall 141, the third outer wall 147 and the further outer wall 148, and a second groove defined by the second outer wall 146, the second sidewall 143, the third outer wall 147 and the fourth outer wall 148. The first rail 131 is communicated with the first groove 137 and the second rail 132 is communicated with the second groove 138.

In one embodiment, the storage assembly 100 may include a baffle plate disposed at the first end 135 or/and the second end 136 to block a view inside the rails 131, 132 to provide an aesthetic appearance, and prevent the first cover 110 and/or the second cover moving out unexpectedly from a first groove 137 and a second groove 138. Alternatively, the first end 135 of the first rail 131 and/or the second end 136 of the second rail 132 may be open and communicated with the top space of the housing 130. The user may move the first cover 110 and/or the second cover 120 out from the first groove 137 and/or the second groove 138.

Figure 4A:
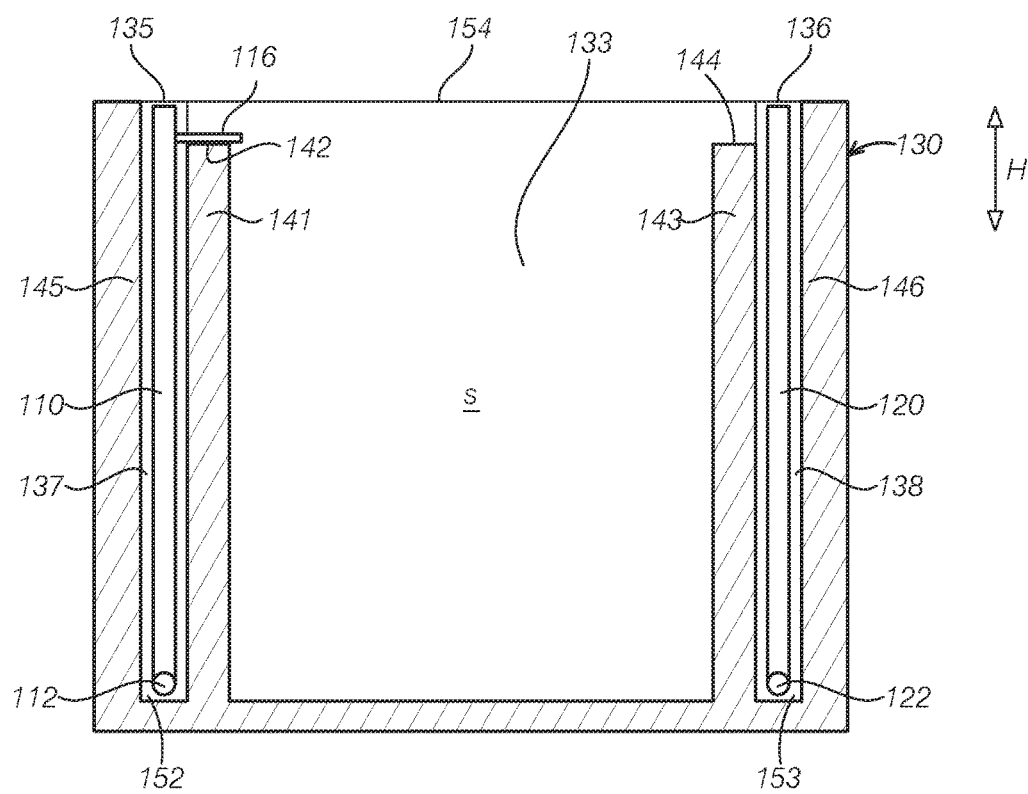
FIG. 4A shows a cross sectional view the storage assembly in FIG. 3, illustrating the first cover at a first stowed position.
Figure 4B:
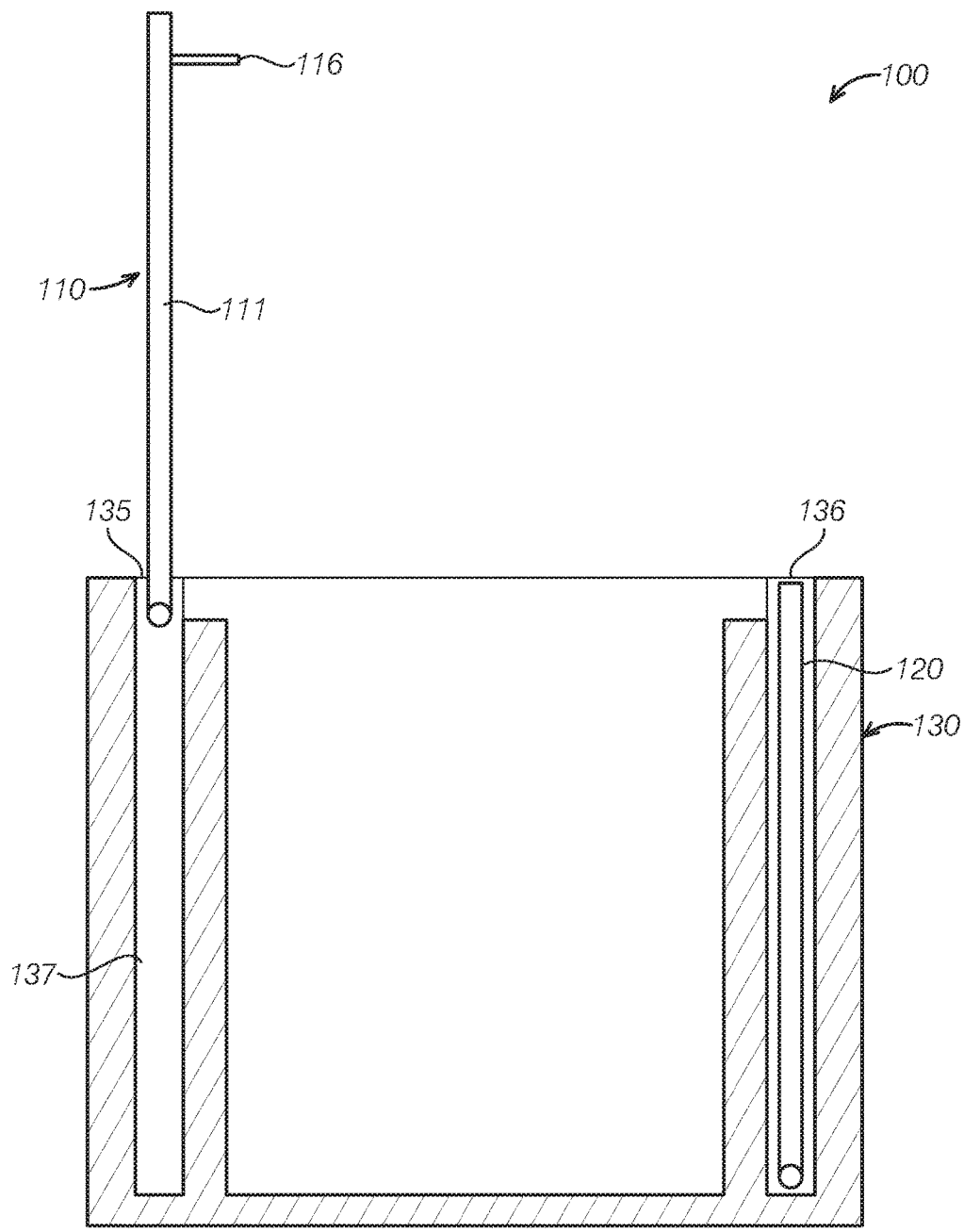
FIG. 4B shows a cross sectional view the storage assembly in FIG. 3, illustrating the first cover at a first middle position.
Figure 4C:
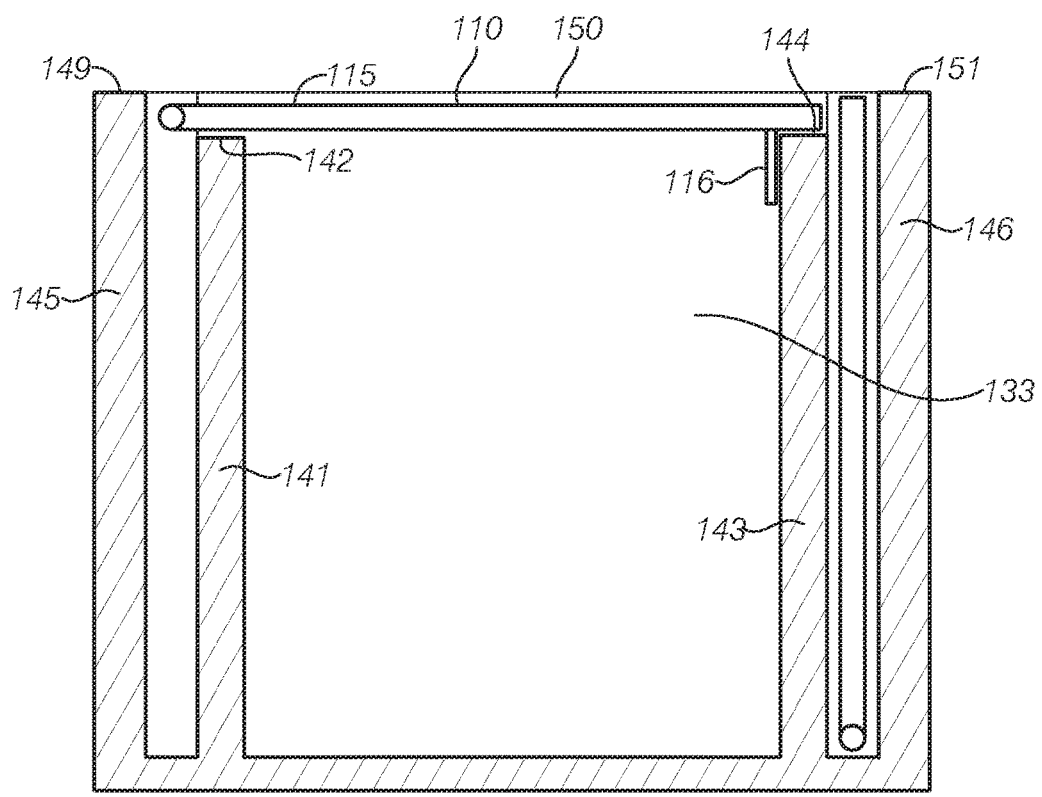
FIG. 4C shows a cross sectional view the storage assembly in FIG. 3, illustrating the first cover at a first use position.

The first cover 110 is moveable between a first stowed position illustrated in FIG. 4A and a first middle position illustrated in FIG. 4B while the first foot portion 112 moves in the first rail 131, and the first cover 110 is pivotable from the first middle position to a first use position illustrated in FIG. 4C via the first end 135 to cover the cavity 133. The second cover 120 is moveable between a second stowed position illustrated in FIG. 4A and a second middle position illustrated in FIG. 4D while the second foot portion 122 moves in the second rail 132, and the second cover is pivotable from the second middle position to a second use position illustrated in FIG. 4E via the second end 136 to cover the cavity 133.

Figure 1:
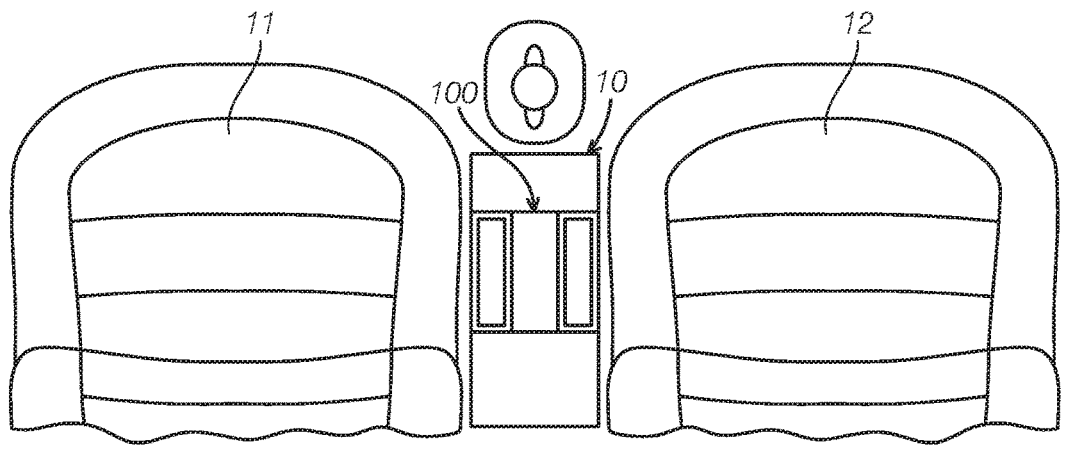
FIG. 1 shows an example storage assembly in a vehicle.

Referring to FIG. 1, in some embodiments, the vehicle storage assembly 100 is positioned at a vehicle floor console or a center console 10 between a front left seat and a front right seat, and the housing 130 is a portion of the center console 10. In other embodiments, the storage assembly 10 may be located at any positions of the vehicle, such as, an instrument control panel, a door, a center armrest at rear seats. It should be appreciated that the storage assembly may have other applications, for example, the applications on an airplane, a ship, a home, or a commercial appliance. FIGS. 2A and 2B are top views of the first cover 110 and the second cover 120 according to one embodiment of the present disclosure. The first cover 110 includes a first base 111. For an illustration purpose, the first base 111 is shown as a flat plate. It should be appreciated that the first base 111 may have other shapes such as an arc or a folded shape. A first group through hole 113 may be formed on the first base 111. In one embodiment, the first group through hole 113 may include a round hole 113a to receive a cup or a drink container, and elongated slots 113b or 113c to receive flat items such as cell phones. It should be appreciated that the first group through hole 113 may include more or less holes with different shapes or sizes. Continuing with FIG. 2A, the first cover 110 also includes a first foot portion 112 extending from the first base 111. The first foot portion is moveable or slidable in the first rail 131 such that the first cover 110 is moveable between the first stowed position as shown in FIG. 4A and the first middle position as shown in FIG. 4B. At the first stowed position, the first foot portion 112 is at a bottom 152 of the first rail 131. In the depicted embodiment, the first foot portion 112 includes two protrusions extending from the two opposite sides of the first base 111 of the first cover 110.

Figure 4D:
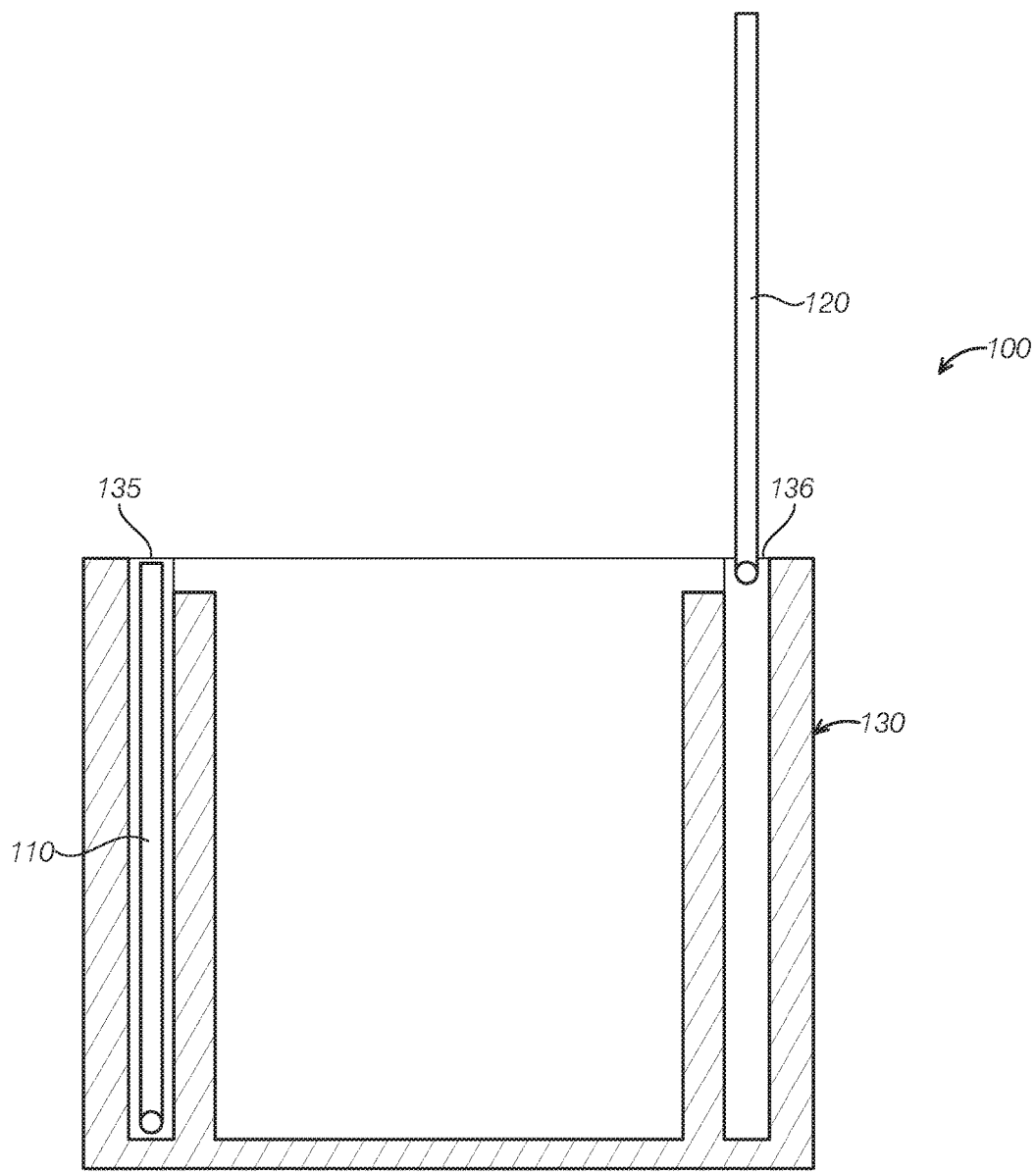
FIG. 4D shows a cross sectional view the storage assembly in FIG. 3, illustrating the second cover at a second stowed position.

Similarly, the second cover 120 includes a second base 121. For the illustration purpose, the second base 121 is shown as a flat plate. It should be appreciated that the second base 121 may have other shapes such as an arc shape or a folded shape. The second base 121 may be formed to have a second group through holes 123 having different shapes from the first group through holes 113. The first group through holes 113 and the second group through holes 123 may be different in the number, shape, and/or size. For example, the second group through hole 123 may include round holes 123a, 123b to receive cups or drink containers. It should be appreciated that the second group through hole may include more or less holes or have different shapes or sizes. Continuing with FIG. 2B, the second cover 120 may include a second foot portion 122 extending from the second base 121. The second foot portion 122 is moveable or slidable in the second rail 132 such that the second cover 120 is moveable between the second stowed position as shown in FIG. 4A and the second middle position as shown in FIG. 4D. At the second stowed position, the second foot portion 122 is positioned at a bottom 153 of the second rail 132. In the depicted embodiment, the second foot portion 122 includes two protrusions extending from the opposite sides of the second base 121 of the second cover 120.

Figure 4E:
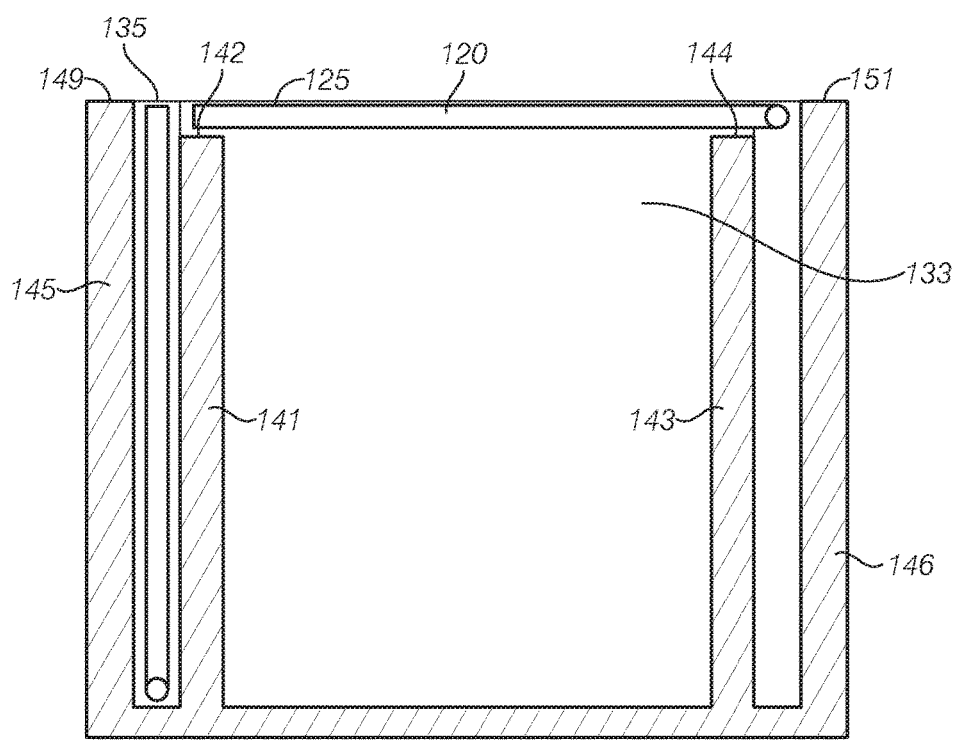
FIG. 4E shows a cross sectional view the storage assembly in FIG. 3, illustrating the second cover at a second use position.

Referring to FIGS. 3 to 4E, FIG. 3 schematically depicts a top view of the storage assembly 100, illustrating the first cover 110 and the second cover 120 at a stowed position. FIG. 4A to 4E schematically depict a cross sectional view of the storage assembly 100 in FIG. 3, illustrating the first cover 110 and the second cover 120 at different positions. The storage assembly 100 includes a housing 130. The housing 130 may include a cavity to form a storage space S. A top of the cavity 133 has an opening, which may be covered by the first cover 110 or the second cover 120 to form a storage space S which is at least partially enclosed.

The housing 130 may include a first groove 137 and a second groove 138 extending along a height direction H of the storage assembly 100. At a first stowed position, the first cover 110 is received in the first groove 137. Similarly, the second cover 120 is received in the second groove 138 at a second stowed position. In the embodiment depicted in FIG. 3, the first groove 137 and the second groove 138 are positioned at opposite sides of the cavity 133. The housing 130 has a first sidewall 141 and a second sidewall 143 opposing each other. The first sidewall 141, the second sidewall 143, a portion of the third wall 147 and a portion of the fourth wall 148 form the cavity 133. The first groove 137 is adjacent to the first sidewall 141, and the second groove 138 is adjacent to the second sidewall 143. In other words, the first sidewall is positioned in the cavity 133 and the first groove 137, and the second sidewall 143 is positioned between the cavity 133 and the second groove 138. That is, the first groove 137 is partially defined by the first outer wall 145 and the first sidewall 141, the second groove 138 is partially defined by the second outer wall 146 and the second sidewall 143. A first top 142 of the first sidewall 141 and a second top 144 of the second sidewall 143 are substantially at a same level. That is, a height of the first outer wall 145 and a height of the second souter wall 146 are substantially the same. Thus, when the first cover 110 is at the first use position as shown in FIG. 4C, the first top 142 and the second top 144 together support the first cover 110.

In some embodiments, the first cover 110 may be configured such that an outer surface or an upper surface 115 of the first cover 110 is substantially aligned with a top surface 149 of the first outer wall 145 at the first use position, and thus to provide a better aesthetic appearance. Alternatively, as shown in FIG. 4C, the first cover 110 may be configured such that the outer surface 115 the first cover is lower than the top surface 149 of the first sidewall 145 at the first use position to form a recess 150 on the first cover. In this way, a user can temporally store some small flat items such as cards or cell phones in the recess 150.

Similarly, when the second cover 120 is at the second use position as shown in FIG. 4E, the first top 142 and the second top 144 together support the second cover 120. At the second use position, an outer surface or a top surface 125 of the second cover 120 is levered with a top surface 151 of the second outer sidewall 146. Alternatively, the outer surface 125 of the second cover 120 may be lower than the top surface 151 of the second sidewall 146 at the second use position.

Turning back to FIG. 3 and FIG. 4A, the housing 130 may further include a first rail 131 and a second rail 132 extending at a height direction H. The first rail 131 communicates with the first groove 137, and the second rail 132 communicates with the second groove 138. The first cover 110 includes the first foot portion 112 receivable in the first rail 131, and the second cover 120 includes the second foot portion 122 receivable in the first rail 132. The first foot portion 112 and the first rail are configured such that the first cover 110 is movable between the first stowed position as shown in FIG. 4A and the first middle position as shown in FIG. 4B. For example, the first foot portion 112 is smaller than the first rail 131. At the first stowed position, the first cover 110 is located in the first groove 137, and the first foot portion 112 is located at a bottom 152 of the first rail 131. When a user lifts the first cover 110, the first foot portion 112 moves up in the first rail 131 with the first cover 110 to the first end 135 of the first rail 131. Thus, the first foot portion 112 is pivotally connected to the first end 135 such that the first cover 110 can be pivoted to the first use position as shown in FIG. 4C relative to the first end 135 to cover the cavity 133. In some embodiments, one side of the first cover 110 includes a first handle 116 to facilitate a movement of the first cover 110 by the user. The first handle 116 may extend from the first base 111 of the first cover.

Similarly, the second cover 120 is movable between the second stowed position as shown in FIG. 4A and the second middle position as shown in FIG. 4D while connected with the housing 130 via the second foot portion 122 received in the second rail 132. At the second stowed position, the second cover 120 is positioned in the second groove 138, and the second foot portion 122 is positioned at the bottom 153 of the second rail 132. When the user lifts the second cover 120, the second foot portion 122 moves up in the second rail 132 with the first cover 120 to near the second end 136 of the second rail 132. Thus, the second foot portion 122 is pivotally connected to the second end 136 such that the second cover 120 pivots to the second use position as shown in FIG. 4E, to cover the cavity 133. In some embodiments, one side of the second cover 120 includes a second handle (not shown) to facilitate a movement of the second cover 210 by the user.

Figure 5:
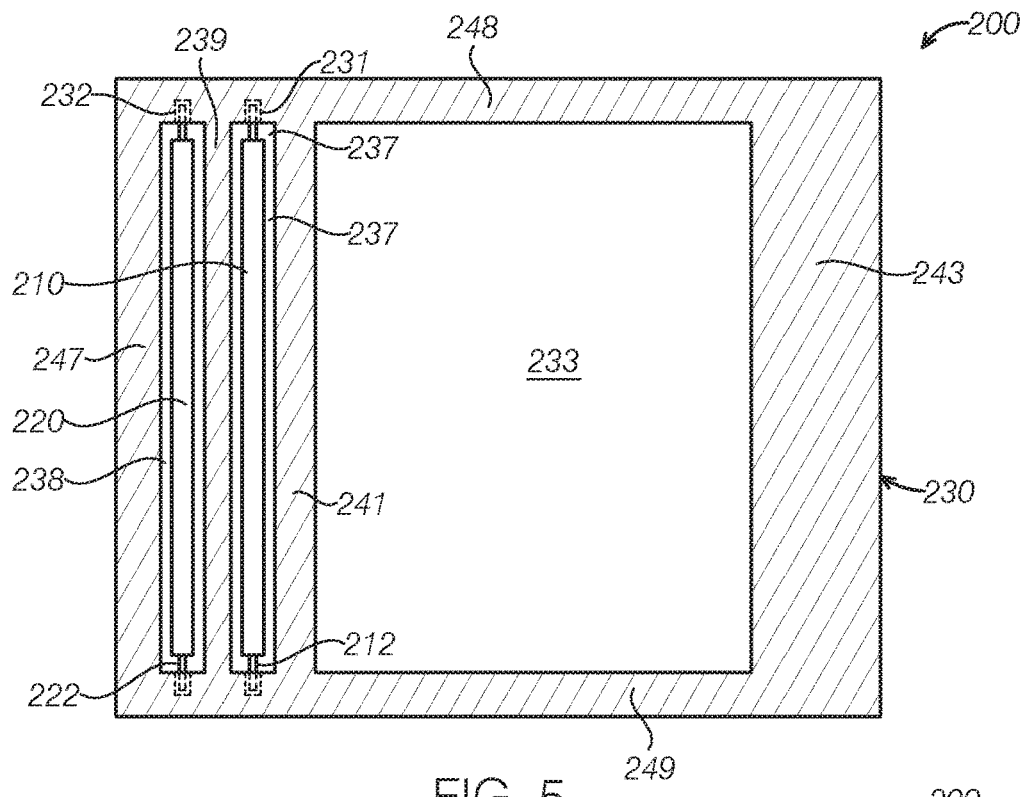
FIG. 5 shows a storage assembly in a vehicle according to another embodiment.
Figure 6A:
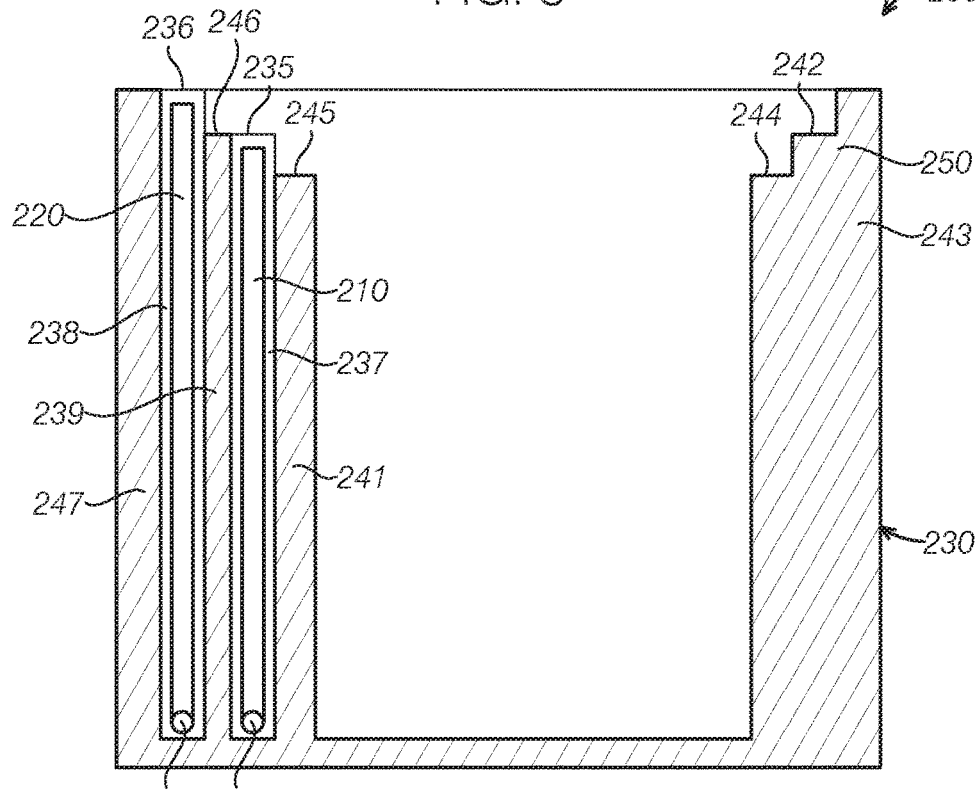
FIG. 6A shows a cross sectional view of the storage assemble in FIG. 5, illustrating a first cover at a first stowed position.
Figure 6B:
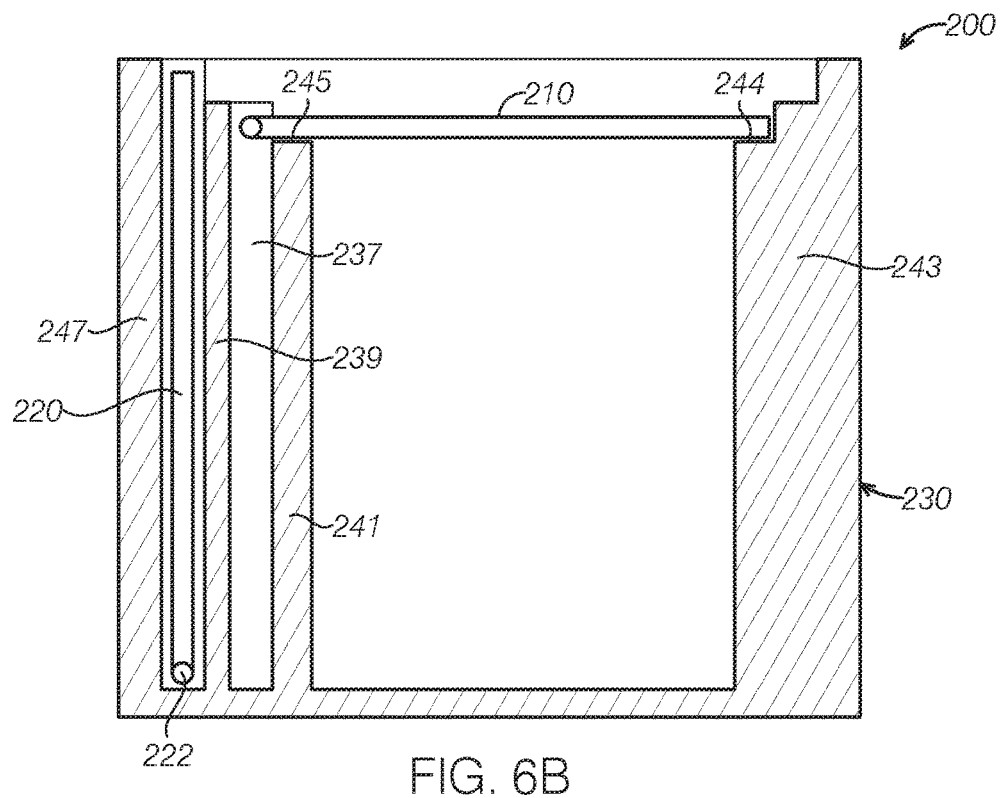
FIG. 6B shows a cross sectional view of the storage assemble in FIG. 5, illustrating the first cover at a first use position.
Figure 6C:
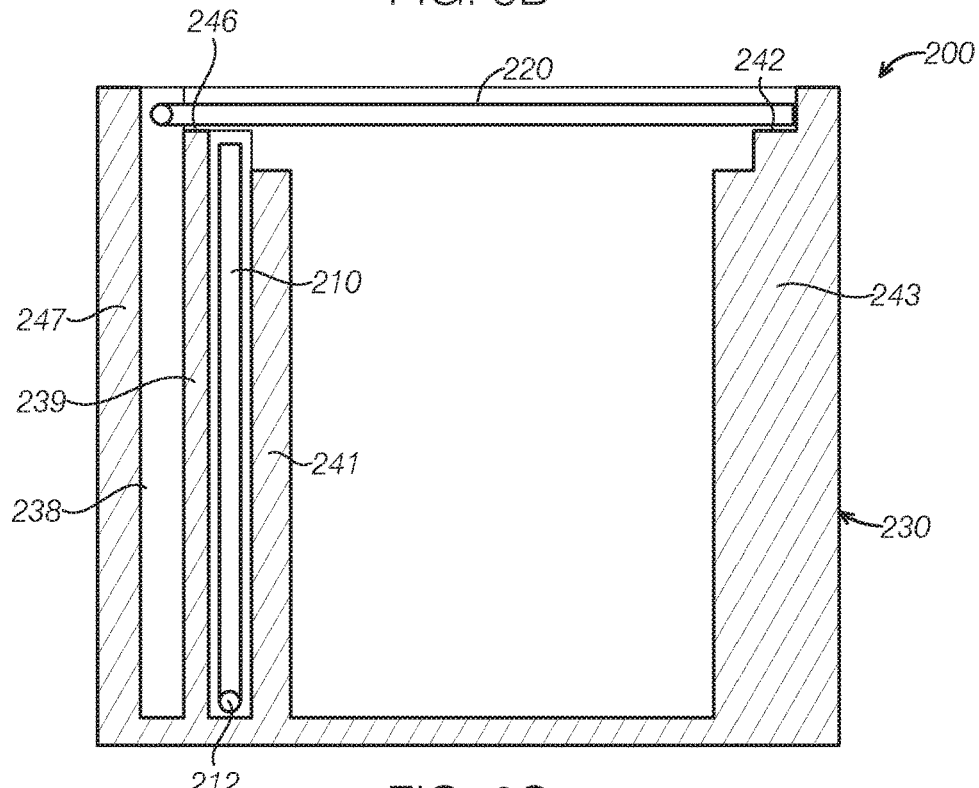
FIG. 6C shows a cross sectional view of the storage assemble in FIG. 5, illustrating a second cover at a second stowed position.

Referring to FIGS. 5 to 6C, FIG. 5 schematically depicts a top view of a storage assembly 200 according to another embodiment of the present disclosure. FIGS. 6A to 6C schematically depict a cross sectional view of a first cover 210 and a second cover 220 of the storage assembly 200 at different positions. In the depicted embodiments, a first groove 237 and a second groove 238 are positioned at a same side of a cavity 233, and the first groove 237 is adjacent to the second groove 238. In other words, the first groove 237 is positioned between the second groove 238 and cavity 233.

Referring to FIG. 5, the housing 230 includes a first sidewall 241, a second sidewall 239, a first outer wall 247, a second outer wall 243, a third outer wall 248 and a fourth outer wall 249. The second sidewall 239 is positioned between the first side wall 241 and the first outer wall 247. The first sidewall 241 and the second outer wall 243 form the cavity 233. The first side wall 241 and the second sidewall 239 form or define the first groove 237, and the second sidewall 239 and the first outer wall 247 form or define the second groove 238. That is, the first groove 237 and the second groove 238 are at the same side of the cavity 233. The first cover 210 and the second cover 220 are at the same side of the cavity 233 (e.g., at a driver side) when the first cover 210 and the second cover 220 are not in use. The first cover 210 has a first foot portion 212 that is moveable or slidable in the first rail 231. The second cover 220 has a second foot portion 222 that is moveable or slidable in the second rail 232.

Referring to FIG. 6A, a top portion 250 of the second sidewall 243 has a stepped configuration. For example, the second sidewall 243 has a second top 244 and a third top 242 different from the second top 244 in height. A height of the second top 244 is the same as a height of the first top 245 of the first sidewall 241, such that the first cover 210 is supported on the first top 245 and the second top 244 at a leveled position at a first use position shown in FIG. 6B.

In addition, a height of the third top 242 is substantially the same as a top 246 of the second sidewall 239 such that the second cover 220 is supported on the third top 242 and the top 246 of the second sidewall 239 at a leveled position at a second use position as shown in FIG. 6C.

The storage assembly of the present disclosure includes a plurality covers having different configurations of through holes to hold different items. In this way, a user can selectively use a cover to hold different items such as a cup, a drink container or a cell phone. The storage assembly has simple structure. Further, the storage assembly includes grooves to store the covers and thus no separate storage space for the covers is needed.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A storage assembly in a vehicle, comprising:
a first cover having a first foot portion and a second cover having a second foot portion;
a housing, wherein the housing includes a first rail extending at a height direction and a second rail extending at the height direction, and a cavity forming a storage space, wherein the first rail has a first end and the second rail has a second end, and the first end and the second end are adjacent to a top of the housing, wherein the first cover is moveable between a first stowed position and a first middle position when the first foot portion moves in the first rail, and pivotable from the first middle position to a first use position via the first end to cover the cavity, and wherein the second cover is moveable between a second stowed position and a second middle when the second foot portion moves in the second rail, and pivotable from the second middle position to a second use position via the second end to cover the cavity.

2. The storage assembly of claim 1, wherein the housing further includes a first groove to receive the first cover at the first stowed position and a second groove to receive the second cover at the second stowed position, and wherein the first rail is communicated with the first groove and the second rail is communicated with the second groove.

3. The storage assembly of claim 2, wherein the housing includes a first outer wall, a second outer wall, a first sidewall and a second sidewall, wherein the first sidewall and the second sidewall define the cavity, wherein the first groove is defined by the first outer wall and the first sidewall, and is positioned on one side of the housing, and wherein the second groove is defined by the second outer wall and the second sidewall and is positioned on another side of the housing.

4. The storage assembly of claim 3, wherein the first sidewall includes a first top to support the second cover when the second cover is at the second use position, wherein the second sidewall includes a second top to support the first cover when the first cover is at the first use position, and wherein a height of the first top of the first sidewall and a height of the second top of the second sidewall are substantially the same.

5. The storage assembly of claim 2, wherein the housing includes a first outer wall, a second sidewall adjacent to the first outer wall, a first sidewall adjacent to the second sidewall and a second outer wall, wherein the first sidewall and the second outer wall define the cavity, wherein the first groove is defined by a first sidewall and the second sidewall, and wherein the second groove is defined by the second sidewall and the first outer wall.

6. The storage assembly of claim 5, wherein the second outer wall has a second top to support the first cover when the first cover is at the first use position, and a third top to support the second cover when the second cover is at the second use position, and wherein the second top and the third top have different heights.

7. The storage assembly of claim 1, wherein the first cover has a first group through holes and the second cover has a second group through holes different from the first group through holes, and wherein the first group through holes and the second group through holes are configured to hold items.

8. The storage assembly of claim 1, wherein the storage assembly is disposed in a center console of a vehicle.

9. A center console of a vehicle, comprising:
a storage assembly including:
a first groove extending at a height direction;
a first rail communicating with the first groove and having a first end at a top of the first rail;
a second groove extending at the height direction;
a second rail communicating with the second groove and having a second end at a top of the second rail;
a cavity to form a storage space;
a first cover having a first foot portion; and
a second cover having a second foot portion;
wherein, at a first stowed position, the first cover is positioned in the first groove, the first foot portion is positioned at a bottom of the first rail, wherein the first cover is moveable from a first stowed position to a middle position in the first rail such that the first foot portion is adjacent to the first end and pivotable via the first end from the first middle position to a first use position to cover the cavity wherein, at a second stowed position, the second cover is positioned in the second groove, the second foot portion is positioned at a bottom of the second rail, wherein the second cover is moveable from the second stowed position to a second middle position such that the second foot portion is adjacent to the second end and pivotable via the second end from the second middle position to a second use position.

10. The center console of claim 9, wherein the first foot portion includes two protrusions extending from two opposite sides of the first cover, and wherein the second foot portion includes two protrusions extending from two opposite sides of the second cover.

11. A storage assembly in a vehicle, comprising:
a first cover;
a second cover;
a housing, wherein the housing includes a first groove extending at a height direction, a second groove extending at the height direction and a cavity to form a storage space, wherein the first cover is moveable in the first groove and pivotable to a first use position to cover the cavity, and wherein the second cover is moveable at the second groove and pivotable to a second use position to cover the cavity.

12. The storage assembly of claim 11, wherein the first cover has a first group through holes, and the second cover has a second group through holes different from the first group through holes.

13. The storage assembly of claim 12, wherein the first group through holes include an annular-shaped hole to hold a cup or a drink container and a rectangular-shaped hole to hold a cellular phone, and wherein the second group through holes include annular-shaped holes to hold a cup or a drink container.

14. The storage assembly of claim 11, wherein the first groove and the second groove are positioned at an opposite side of the cavity, respectively, and wherein the housing further includes a first rail communicating with the first groove and having a first end, and a second rail communicating with the second groove and having a second end.

15. The storage assembly of claim 14, wherein the first cover includes a first foot portion receivable in the first rail and the first foot portion is pivotally connected to the first end of the first rail to enable the first cover to be pivoted to the first use position when the first foot portion moves to the first end of the first rail with the first cover; and wherein the second cover includes a second foot portion receivable in the second rail, and the second foot portion is pivotally connected to the second end of the second rail to enable the second cover to be pivoted to the second use position when the second foot portion moves to the second end of the second rail with the second cover.

16. The storage assembly of claim 14, wherein the housing includes a first sidewall adjacent to the first groove, a first outer wall opposing the first sidewall, a second sidewall adjacent to the second groove, and a second outer wall opposing the second sidewall, wherein the first groove is defined by the first outer wall and the first sidewall, and the second groove is defined by the second outer wall and the second sidewall, wherein a height of the first sidewall and a height of the second sidewall are substantially the same, wherein a height of the first outer wall and a height of the second outer wall are substantially the same, and wherein the height of the first sidewall is less than the height of the first outer wall.

17. The storage assembly of claim 16, wherein at the first use position or the second use position, an outer surface of the first cover and an outer surface of the second cover are substantially aligned with top surfaces of the first outer wall and a top of the second outer wall.

18. The storage assembly of claim 16, wherein at the first use position or the second use position, an outer surface of the first cover and an outer surface of the second cover is lower than a top surface of the first outer wall and a top surface of the second outer wall.

19. The storage assembly of claim 11, wherein one side of the first cover and one side of the second cover includes a first handle and a second handle, respectively, to facilitate movements of the first cover and the second cover.

* * * * *